(12) United States Patent
Kang et al.

(10) Patent No.: US 8,794,099 B2
(45) Date of Patent: Aug. 5, 2014

(54) WEIGHT COMPENSATION MECHANISM AND ROBOT ARM USING THE SAME

(75) Inventors: Sung Chul Kang, Seoul (KR); Chang Hyun Cho, Gwangju (KR); Mun Sang Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 334 days.

(21) Appl. No.: 13/314,566

(22) Filed: Dec. 8, 2011

(65) Prior Publication Data

US 2012/0291582 A1 Nov. 22, 2012

(30) Foreign Application Priority Data

May 16, 2011 (KR) ........................ 10-2011-0045658

(51) Int. Cl.
*B25J 17/00* (2006.01)
*B25J 17/02* (2006.01)
*B25J 18/00* (2006.01)
*B25J 19/00* (2006.01)

(52) U.S. Cl.
CPC ............ *B25J 19/0016* (2013.01); *Y10S 901/48* (2013.01)
USPC ........................................ 74/490.01; 901/48

(58) Field of Classification Search
CPC .... B25J 19/0016; B25J 19/0008; B25J 9/042; B25J 19/002; B25J 9/102; B25J 9/104; B25J 17/0241; B25J 17/0283; B25J 19/0004; B25J 19/0258; B25J 18/04; B25J 17/00
USPC .............................. 74/490.01, 490.05; 901/48
See application file for complete search history.

(56) References Cited

U.S. PATENT DOCUMENTS

| 6,298,569 | B1 | 10/2001 | Raab et al. | |
| 8,434,384 | B2 * | 5/2013 | Kang et al. | 74/490.01 |
| 2008/0216596 | A1 * | 9/2008 | Madhani et al. | 74/490.05 |
| 2013/0061709 | A1 * | 3/2013 | Kim et al. | 74/490.05 |
| 2013/0180353 | A1 * | 7/2013 | Kang et al. | 74/490.04 |

FOREIGN PATENT DOCUMENTS

| EP | 0 322 670 A1 | 7/1989 |
| GB | 2 114 536 A | 8/1983 |
| KR | 10-0788787 B1 | 12/2007 |
| KR | 10-1045994 B1 | 7/2011 |
| WO | WO 2004/076130 A2 | 9/2004 |

OTHER PUBLICATIONS

Cho, C. et al., "Static balancing of a manipulator with hemispherical work space," *2010 IEEE/ASME International Conference on Advanced Intelligent Mechatronics*, Jul. 6-9, 2010, pp. 1269-1274, Montreal, Canada.

(Continued)

*Primary Examiner* — Justin Krause
(74) *Attorney, Agent, or Firm* — Fenwick & West LLP

(57) ABSTRACT

The present invention discloses a weight compensation mechanism installed at a rotatable three-degree-of-freedom link member, wherein a first rotation of the link member is a yaw rotation aligned with the direction of the gravity and second and third rotations of the link member are respectively a roll rotation and a pitch rotation, wherein the second and third rotations are restrained by a plurality of differential bevel gears, and wherein a pair of cam plates is fixed to shafts of a pair of rotary bevel gears in the plurality of differential bevel gears, and a one-degree-of-freedom weight compensator is provided to be connected to the cam plates.

13 Claims, 7 Drawing Sheets

(56) References Cited

OTHER PUBLICATIONS

European Patent Office, European Search Report and Opinion, European Patent Application No. 11194841.0, Apr. 3, 2012, seven pages.

Cho, Changhyun. et al., "Design of a 2-dofs Manipulator with Gravity Compensators," *The Korean Society of Mechanical Engineers*, Fall Conference 2010, Abstracts of Lectures and Papers, 2010, pp. 1409-1413 (with English abstract).

* cited by examiner

WEIGHT COMPENSATION MECHANISM AND ROBOT ARM USING THE SAME

CROSS-REFERENCE TO RELATED APPLICATION

This application claims priority to Korean Patent Application No. 10-2011-0045658, filed on May 16, 2011, and all the benefits accruing therefrom under 35 U.S.C. §119, the contents of which in its entirety are herein incorporated by reference.

BACKGROUND

1. Field

The present disclosure relates to a weight compensation mechanism and a robot arm using the same, and more particularly, to a weight compensation mechanism removing an influence generated in a multi-joint link mechanism such as a robot arm due to weight such as gravity and a robot arm using the same.

2. Description of the Related Art

In recent years, various robots have been developed in order to facilitate the human living environment or assist a work in the industrial field. Especially, many types of robot arms have been developed which are utilized in various industrial fields including painting, welding, and the like. Since such an industrial multi-joint robot arm needs to transfer and support a heavy working object, it is very important to design the robot arm capable of generating high torque.

Since such a multi-joint robot arm receives load torque due to the own weight or the weight of the working object, this load torque directly affects a design in capacity of a driving machine such as a driving motor. In particular, a torque component generated by the own weight of the robot arm occupies a large portion in the load acting on the driving motor.

In the case of the existing robot arm, when the capacity of the driving machine of the robot arm is determined, not only the torque generated by the working object, but also the gravity torque generated by the own weight of the robot arm need to be considered. For this reason, there is a problem in that the capacity of the power source for driving the robot arm increases.

Furthermore, simple ideas have been theoretically suggested to compensate the weight caused by the own weight of the robot arm and the like, but mechanisms practically adopting the ideas have not been developed.

SUMMARY

The present disclosure is directed to providing a weight compensation mechanism removing an influence generated in a link mechanism such as a robot arm configured as a multi-degree-of-freedom joint due to gravity caused by own weight and a robot arm using the same.

In one aspect, there is provided a weight compensation mechanism installed at a rotatable three-degree-of-freedom link member, wherein a first rotation of the link member is a yaw rotation aligned with the direction of the gravity and second and third rotations of the link member are respectively a roll rotation and a pitch rotation, wherein the second and third rotations are restrained by a plurality of differential bevel gears, and wherein a pair of cam plates is fixed to shafts of a pair of rotary bevel gears in the plurality of differential bevel gears, and a one-degree-of-freedom weight compensator is provided to be connected to the cam plates.

One fixed bevel gear of the plurality of differential bevel gears may be fixed onto a second rotary shaft, and the other rotary bevel gears may be rotatably attached onto a third rotary shaft.

One end of the one-degree-of-freedom weight compensator may be fixed to the link member, and the other end of the one-degree-of-freedom weight compensator may be fixed to the rotary bevel gear or a cam plate connected to the rotary bevel gear.

One end of the one-degree-of-freedom weight compensator may be fixed to the link member, and the other end of the one-degree-of-freedom weight compensator may be fixed to the rotary bevel gear rotating about the third rotary shaft connected to the fixed bevel gear fixed onto the second rotary shaft.

The one-degree-of-freedom weight compensator may include: a spring of which one end is fixed to a spring fixing portion fixed to the link member and the other end is fixed to a sliding member moving along a guide bar attached to the spring fixing portion; and a wire of which one end is fixed to a rotatable coupler provided in a side surface of a cam plate and the other end is connected to a wire fixing portion fixed to the link member through an idle pulley fixed to the link member and a pulley provided inside the sliding member, and wherein when the sliding member moves toward the spring fixing portion, the spring may be compressed.

In one aspect, there is provided a robot arm including the weight compensation mechanism.

In another aspect, there is provided a robot arm capable of performing a weight compensation with three degrees of freedom by connecting the plurality of weight compensation mechanisms to each other.

In another aspect, there is provided a weight compensation mechanism installed at a robot arm of which one end is rotatable with three digress of freedom and the other end is rotatable with two degrees of freedom, wherein a first rotation of one end of the robot arm is a yaw rotation aligned with the direction of the gravity, and second and third rotations of one end of the robot arm are respectively a roll rotation and a pitch rotation, wherein the second and third rotations of one end of the robot arm are restrained by a plurality of differential bevel gears, wherein a pair of first cam plates is fixed to shafts of a pair of first rotary bevel gears in the plurality of differential bevel gears, and a one-degree-of-freedom weight compensator is provided to be connected to the first cam plates, and wherein a second rotary link as an output link of the two-degree-of-freedom rotation (fourth and fifth rotations) of the other end of the robot arm is restrained by the second and third rotations of one end of the robot arm to move in parallel to one end of the robot arm.

One fixed bevel gear of the plurality of differential bevel gears may be fixed onto a second rotary shaft, and the other rotary bevel gears may be rotatably attached onto a third rotary shaft.

One end of the one-degree-of-freedom weight compensator may be fixed to a second cam plate connected to a second rotary bevel gear or the second rotary bevel gear rotating about a fourth rotary shaft or the first cam plate disposed outside the first rotary bevel gear, and the other end of the one-degree-of-freedom weight compensator may be fixed to a first rotary link.

The two-degree-of-freedom rotation of the other end of the robot arm may be restrained by a differential bevel gear.

One fixed bevel gear the plurality of differential bevel gears may be fixed to the second rotary link disposed on a fifth rotary shaft, and the other rotary bevel gears may be rotatably fixed to the first rotary link.

The weight compensation mechanism may further include a synchronization device synchronizing the rotation of a second rotary bevel gear rotating about the fourth rotary shaft and the rotation of the first rotary bevel gear rotating about the third rotary shaft.

The synchronization device may have a structure in which timing belt pulleys are respectively provided on the second rotary bevel gear rotating about the fourth rotary shaft and the first rotary bevel gear rotating about the third rotary shaft and the timing belt pulleys are connected to each other through a timing belt.

The synchronization device may have a structure in which wire pulleys are respectively provided on the second rotary bevel gear rotating about the fourth rotary shaft and the first rotary bevel gear rotating about the third rotary shaft and the wire pulleys are connected to each other through a wire.

The synchronization device may have a structure in which rotary portions are respectively provided on the circumference of the second rotary bevel gear rotating about the fourth rotary shaft and the circumference of the first rotary bevel gear rotating about the third rotary shaft and the rotary portions are connected to each other through a link.

The one-degree-of-freedom weight compensator may include: a spring of which one end is fixed to a spring fixing portion fixed to the link member and the other end is fixed to a sliding member moving along a guide bar attached to the spring fixing portion; and a wire of which one end is fixed to a rotatable coupler provided in a side surface of a cam plate and the other end is connected to a wire fixing portion fixed to the link member through an idle pulley fixed to the link member and a pulley provided inside the sliding member, and wherein when the sliding member moves toward the spring fixing portion, the spring may be compressed.

Three motors may be independently connected to generate the first, second, and third rotations of one end of the robot arm.

In still another aspect, there is provided a robot arm including the weight compensation mechanism.

In still another aspect, there is provided a robot arm capable of performing weight compensation with more than three degrees of freedom by connecting the plurality of weight compensation mechanisms to each other.

In still another aspect, there is provided a robot arm including: a rotatable three-degree-of-freedom link member; and a weight compensation mechanism, wherein a first rotation of the link member is a yaw rotation aligned with the direction of the gravity and second and third rotations of the link member are respectively a roll rotation and a pitch rotation, wherein the second and third rotations are restrained by a plurality of differential bevel gears, wherein a pair of cam plates is fixed to shafts of a pair of rotary bevel gears in the plurality of differential bevel gears, and a one-degree-of-freedom weight compensator is provided to be connected to the cam plates, and wherein one motor is independently disposed for the first rotation, and two motors are connected to the differential bevel gear for the second and third rotations.

The two motors may be connected to a rotary bevel gear rotating about a third rotary shaft.

In still another aspect, there is provided a weight compensation mechanism installed at a robot arm of which one end is rotatable with three digress of freedom and the other end is rotatable with one degree of freedom, wherein a first rotation of one end of the robot arm is a yaw rotation aligned with the direction of the gravity, and second and third rotations of one end of the robot arm are respectively a roll rotation and a pitch rotation, wherein the second and third rotations of one end of the robot arm are restrained by a plurality of differential bevel gears, wherein a pair of cam plates is fixed to shafts of the pair of rotary bevel gears in the plurality of differential bevel gear, wherein a plurality of pulleys and a second link member are rotatably disposed on a fourth rotary shaft of the other end of the robot arm, wherein the plurality of pulleys rotates by being restrained by the second and third rotations of one end of the robot arm, and wherein a plurality of one-degree-of-freedom weight compensators is provided between the plurality of pulleys and the second link member.

One fixed bevel gear of the plurality of differential bevel gears may be fixed onto a second rotary shaft, and the other rotary bevel gears may be rotatably attached onto a third rotary shaft.

The one-degree-of-freedom weight compensator may include: a spring of which one end is fixed to a spring fixing portion fixed to the link member and the other end is fixed to a sliding member moving along a guide bar attached to the spring fixing portion; and a wire of which one end is fixed to a rotatable coupler provided in a side surface of a cam plate and the other end is connected to a wire fixing portion fixed to the link member through an idle pulley fixed to the link member and a pulley provided inside the sliding member, and wherein when the sliding member moves toward the spring fixing portion, the spring may be compressed.

The weight compensation mechanism may further include a synchronization device synchronizing the rotation of the plurality of pulleys and the rotation of a rotary bevel gear rotating about a third rotary shaft.

The synchronization device may have a structure in which timing belt pulleys are respectively provided on the pulley rotating about the fourth rotary shaft and the rotary bevel gears rotating about the third rotary shaft and the timing belt pulleys are connected to each other through a timing belt.

The synchronization device may have a structure in which wire pulleys are respectively provided on the pulley rotating about the fourth rotary shaft and the rotary bevel gears rotating about the third rotary shaft and the wire pulleys are connected to each other through a wire.

The synchronization device may have a structure in which rotary portions are respectively provided on the circumference of the pulley rotating about the fourth rotary shaft and the circumference of the rotary bevel gears rotating about the third rotary shaft and the rotary portions are connected to each other through a link.

One end of the one-degree-of-freedom weight compensator provided between the plurality of pulleys and the second link member may be fixed to the second link member, and the other end of the one-degree-of-freedom weight compensator may be fixed to the plurality of pulleys.

In still another aspect, there is provided a robot arm including: the weight compensation mechanism; and four motors independently connected for first, second, third, and fourth rotations.

In still another aspect, there is provided a robot arm including: the weight compensation mechanism; one motor independently disposed for first and fourth rotations; and two motors respectively connected to differential bevel gears for second and third rotations.

The two motors may be connected to rotary bevel gears rotating about a third rotary shaft.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
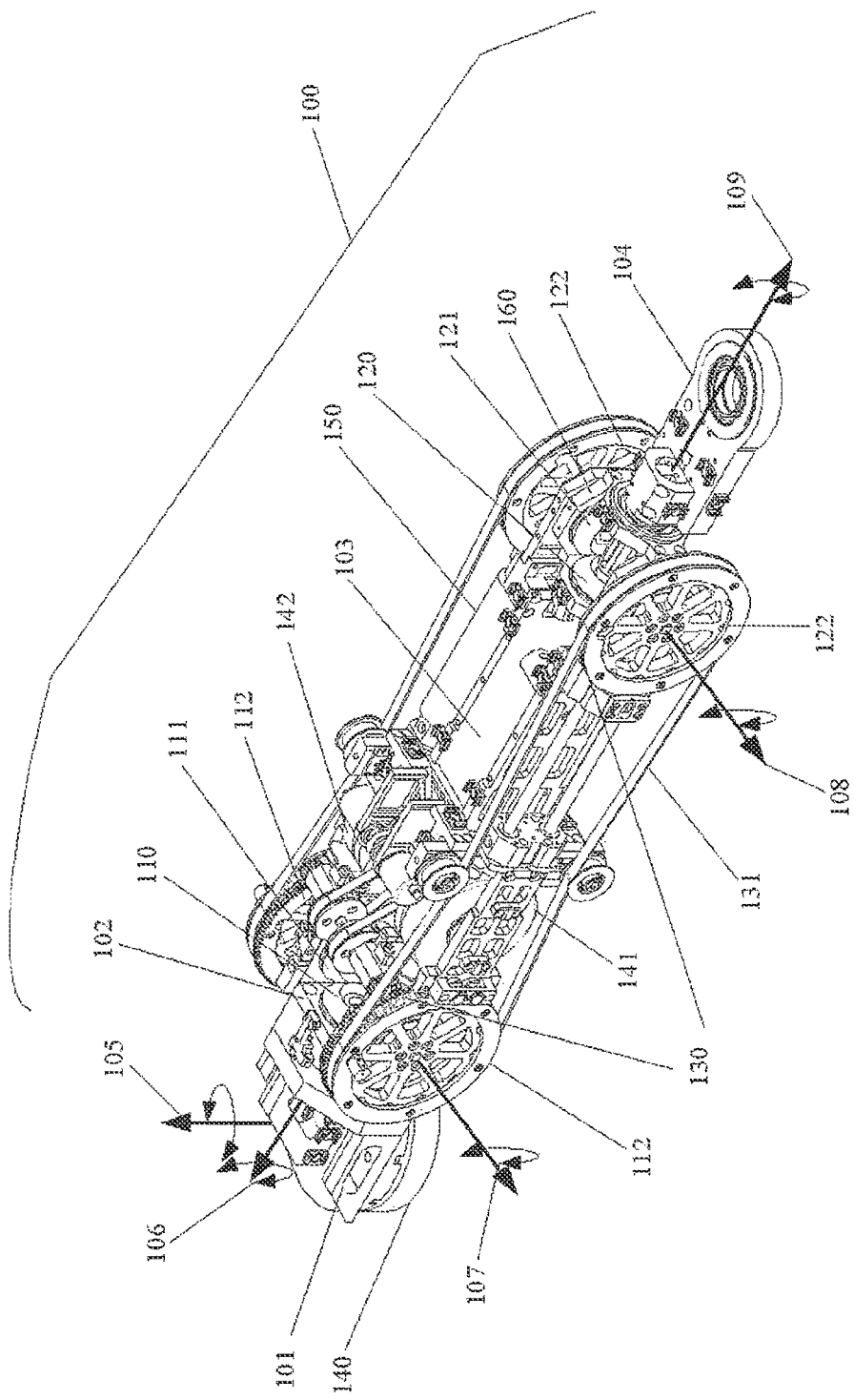
FIG. 1 is a perspective view illustrating a robot arm equipped with a weight compensation mechanism according to an embodiment of the disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

A weight compensation mechanism and a robot arm using the same according to the exemplary embodiments of the disclosure will be described in detail with reference to the accompanying drawings.

Figure 2:
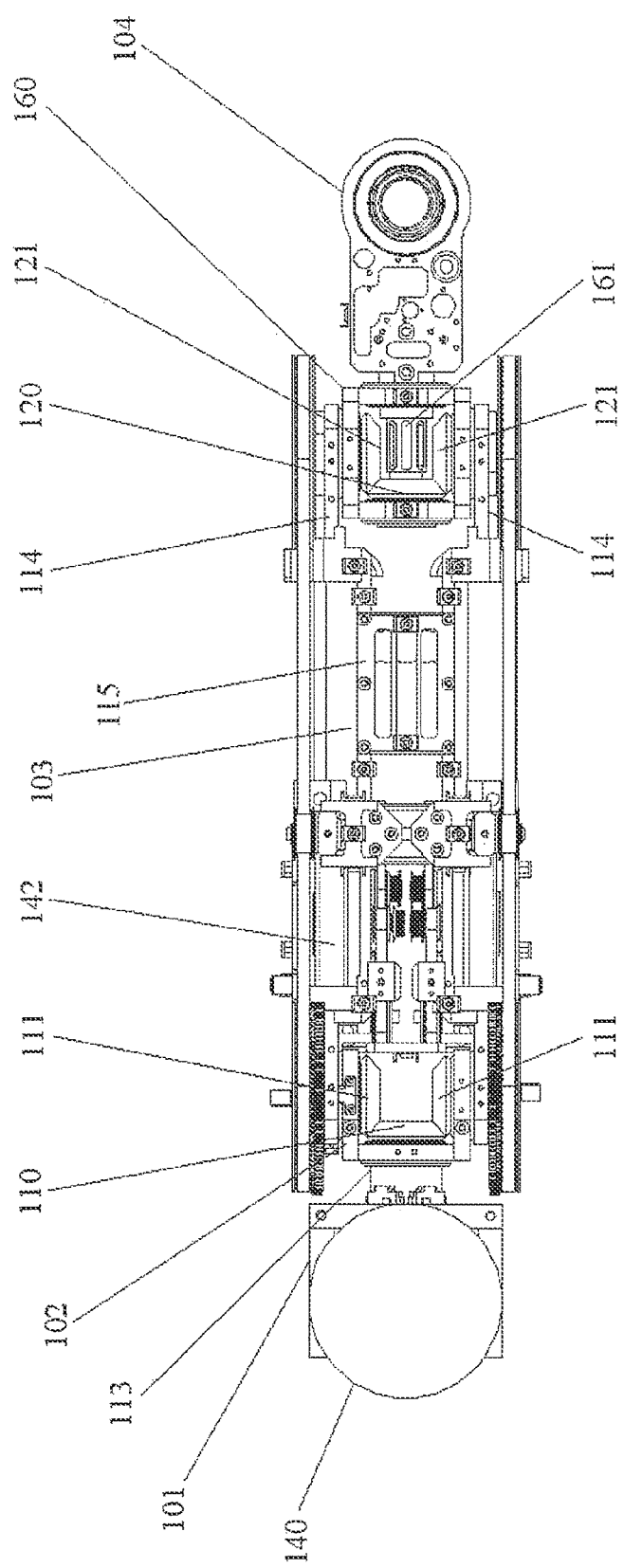
FIG. 2 is a bottom view illustrating the robot arm shown in FIG. 1.
Figure 3:
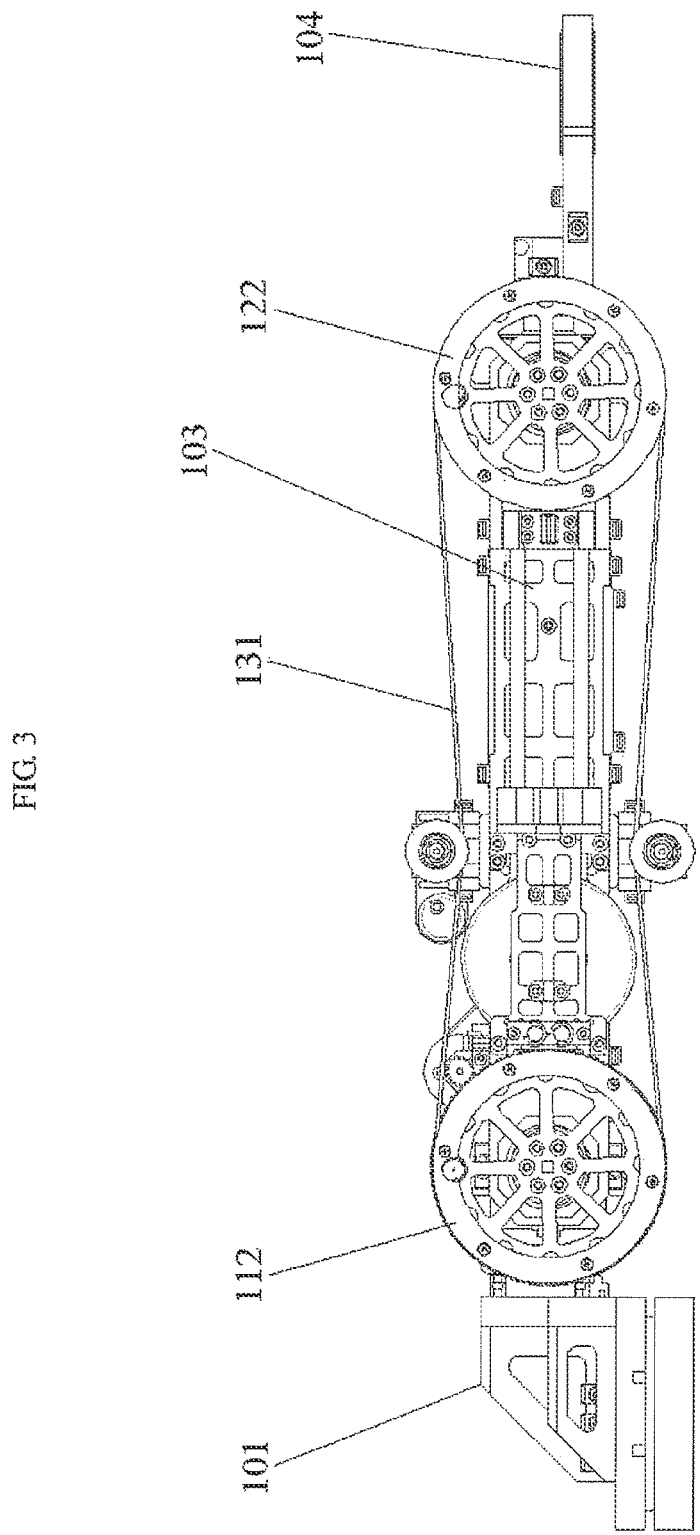
FIG. 3 is a side view illustrating the robot arm shown in FIG. 1.

FIG. 1 is a perspective view illustrating a robot arm equipped with a weight compensation mechanism according to an embodiment of the disclosure. FIG. 2 is a bottom view illustrating the robot arm shown in FIG. 1. FIG. 3 is a side view illustrating the robot arm shown in FIG. 1.

Referring to FIGS. 1 to 3, a robot arm 100 with the weight compensation mechanism according to one embodiment of the disclosure includes a link member 103 that is a base frame of the robot arm, first and second rotary members 101 and 102 that are installed at the joints of the link member 103 and are operable to move with the rotation of the link member 103, and a one-degree-of-freedom weight compensator 150 that absorbs the gravity caused by the own weight with the movement of the robot arm 100.

In the embodiment, the robot arm 100 is configured as a three-degree-of-freedom robot arm that is operable to rotate about a first rotary shaft 105, a second rotary shaft 106, and a third rotary shaft 107 intersecting each other.

First, the rotation of the robot arm 100 will be described. A motor 140 for a first rotation is attached to the base frame, and the output shaft of the motor 140 is connected with the first rotary member 101. Therefore, the first rotary member 101 rotates with the rotation of the motor 140. A connection shaft 113 corresponding to the second rotary shaft 106 is fixed to the first rotary member 101.

A bearing is attached to the side surface of the second rotary member 102, so that the second rotary member 102 is rotatable about the connection shaft 113. The second rotary member 102 has a differential bevel gear. Among these, a fixed bevel gear 110 is fixed to the connection shaft 113, and a pair of first rotary bevel gears 111 is connected to both side surfaces of the second rotary member 102 through bearings. That is, the fixed bevel gear 110 is disposed on the second rotary shaft 106, and the pair of first rotary bevel gears 111 is disposed on the third rotary shaft 107.

The link member 103 includes a pair of side wall links 114 that is disposed with a predetermined gap therebetween and a plurality of spacer links 115 that maintains the gap between the side wall links 114. Both ends of each side wall link 114 are provided with bearings, and one end of the link member 103 is connected with the shaft of the first rotary bevel gear 111. That is, the link member 103 is rotatable about the third rotary shaft 107 with respect to the second rotary member 102.

The outside of the link member 103 is provided with a pair of first cam plates 112 fixed to the shafts of the pair of first rotary bevel gears 111. Therefore, the pair of first rotary bevel gears 111 and the pair of first cam plates 112 rotate in a synchronized manner. Furthermore, a relative rotation is generated between the pair of first cam plates 112 and the link members 103 during the rotation of the link member 103.

The other end of the link member 103 is also provided with a differential bevel gear. The bearing provided at the other end of the link member 103 is connected with the shafts of the pair of second rotary bevel gears 121. The first rotary link 160 located at the other end of the link member 103 is rotatably connected to the pair of second rotary bevel gears 121 through a bearing. That is, the first rotary link 160 is rotatable about the fourth rotary shaft 108 located at the other end of the link member 103.

The fixed bevel gear 120 located inside the first rotary link 160 is attached to a fixed shaft 161 fixed to the second rotary link 104 located at the other end of the link member 103. The first rotary link 160 is provided with a bearing, and is connected to the fixed shaft 161 through the bearing. Therefore, the second rotary link 104 located at the other end of the link member 103 is rotatable about the fourth rotary shaft 108 and the fifth rotary shaft 109 with the rotation of the second rotary bevel gear 121.

Like the structure of one end of the link member 103, the other end of the link member 103 is provided with a pair of second cam plates 122 fixed to the shaft of the second rotary bevel gear 121. Therefore, the second rotary bevel gear 121 and the second cam plate 122 rotate in a synchronized manner. Furthermore, a relative rotation is generated between the second cam plate 122 and the link member 103 during the rotation of the second rotary link 104.

The second cam plate 122 located at the other end of the link member 103 is rotatable by the first cam plate 112 located at one end of the link member 103. For this structure, a timing belt gear 130 is provided on each of the circumference of two pairs of cam plates 112 and 122 located at both ends of the link member 103, and as shown in FIG. 3, the cam plates 112 and 122 provided at both sides of the link member 103 are connected to each other through a timing belt 131.

In the embodiment, the cam plates 112 and 122 provided at both sides of the link member 103 are connected to each other through the timing belt. However, a structure may be adopted in which the cam plates 112 and 122 are provided with wire grooves and are connected to each other through a steel wire. Furthermore, a structure may be adopted in which the side surfaces of the cam plates 112 and 122 are provided with rotary portions and are connected to each other through a link.

Figure 4:
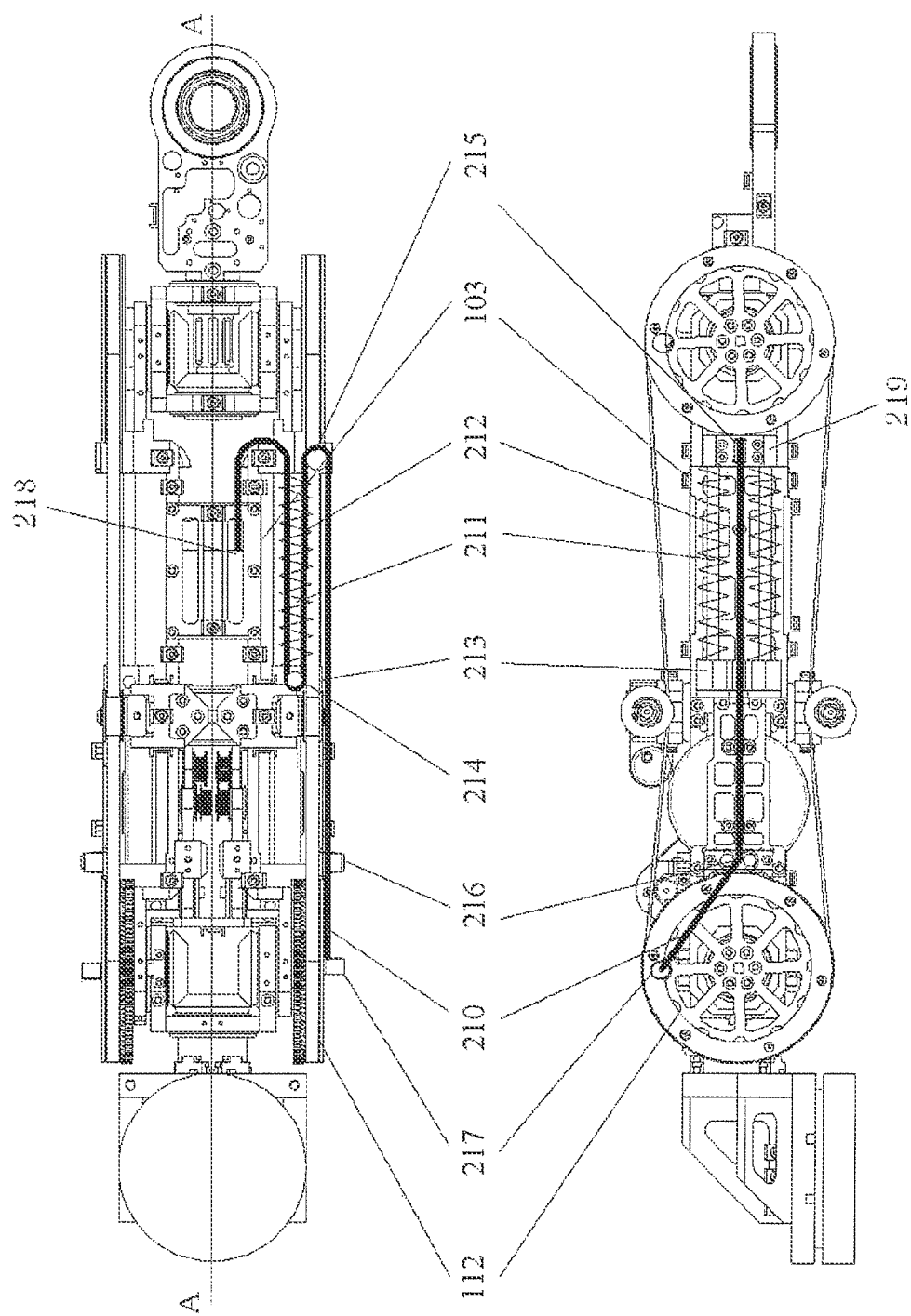
FIG. 4 is a diagram illustrating a structure of a one-degree-of-freedom weight compensator.

FIG. 4 is a diagram illustrating the structure of the one-degree-of-freedom weight compensator.

Referring to FIG. 4, a structure for storing energy generated by the gravity is shown which includes a spring 212, a wire 210, and a pulley 214. One end of the spring 212 is fixed to a spring fixing portion 219 fixed to the link member 103, and the other end of the spring 212 is fixed to a sliding member 213 moving along a guide bar 211 attached to the spring fixing portion 219. Therefore, when the sliding member 213 moves toward the spring fixing portion 219, the spring 212 is compressed.

One end of the steel wire 210 is fixed to a rotatable coupler 217 provided at the side surface of the first cam plate 112. The steel wire 210 is connected to a wire fixing portion 218 fixed to the link member 103 through idle pulleys 216 and 215 provided at the link member 103 and a pulley 214 provided inside the sliding member 213. Although it is not shown in the drawings, the spring 212, the wire 210, and the pulley 214 of FIG. 4 are disposed to be symmetrical about the center line A-A.

In the embodiment, the coil spring is adopted, but the disclosure is not limited thereto. For example, various elastic members such as a plate spring may be adopted. Furthermore, in the embodiment, two guide bars 211 and two springs 212 are installed, but the number thereof may increase or decrease. Furthermore, in the embodiment, the steel wire is used to make the displacement of the spring, but a structure may be adopted in which a coil spring is provided inside a cylinder, one end of the cylinder is fixed to a rotatable coupler 217, and the other end thereof is rotatably fixed to the idle pulley 216.

In the embodiment, the spring, the wire, and the pulley are used to compensate the weight, but the disclosure is not limited thereto. For example, various one-degree-of-freedom weight compensators such as a one-degree-of-freedom weight compensator having cam profiles provided at the inside and outside thereof may be used. In this structure, one end of the one-degree-of-freedom weight compensator may be fixed to the link member 103, and the other end serving as the output portion may be fixed to the first cam plate 112. Alternatively, one end of the one-degree-of-freedom weight compensator may be fixed to the first cam plate 112, and the other end serving as the output portion may be fixed to the link member 103. Alternatively, one end of the one-degree-of-freedom weight compensator may be fixed to the link member 103, and the other end serving as the output portion may be fixed to the second cam plate 122. Alternatively, one end of the one-degree-of-freedom weight compensator may be fixed to the second cam plate 122, and the other end serving as the output portion may be fixed to the link member 103.

The rotation at the first rotary shaft 105 is performed by the motor 140. Furthermore, for the rotation at the second rotary shaft 106 and the third rotary shaft 107, the pair of first cam plates 112 has a gear provided on the circumferential surfaces thereof to be connected to a pinion gear. Then, by using the timing belt pulley fixed to the pinion gear, the pair of first cam plates 12 may be connected to the timing belt pulley fixed to the shafts of the motors 141 and 142 fixed to the link member 103 through the timing belt. The power transmission method of driving the first cam plates 112 using the motors 141 and 142 described in the embodiment is merely an example, and the disclosure is not limited thereto.

Furthermore, although it is not described in the embodiment, for the rotation at the second rotary shaft, one end of the motor may be fixed to the first rotary member 101, and the other end serving as the output portion may be fixed to the second rotary member 102 through a gear pulley or the like. Similarly, for the rotation at the third rotary shaft, the motor may be directly connected between the link member 103 and the second rotary member 102.

So far, the structure of the robot arm 100 with the weight compensation mechanism has been described. The operation of the robot arm 100 with the weight compensation mechanism will be described below.

When the first rotary shaft 105 is parallel to the direction of the gravity, there is no variation in torque acting on the first rotary shaft 105 of the link member 103. Therefore, the weight compensation in the first rotation direction will not be considered.

First, the operation of the robot arm 100 rotating about the second rotary shaft 106 will be examined. When the motor 141 and the motor 142 facing each other rotate in the same direction (which looks like the same direction, but the actual rotation directions are opposite to each other), the link member 103 rotates about the second rotary shaft 106.

The second rotary member 102 rotates about the connection shaft 113 of the fixed bevel gear 110 in accordance with the rotation of the link member 103. At this time, the pair of first rotary bevel gears 111 rotates while meshing with the fixed bevel gear 110 in accordance with the rotation of the second rotary member 102. Accordingly, the pair of first cam plates 112 integrally connected to the rotary bevel gear 111 rotates together.

When the first cam plate 112 rotates, the coupler 217 attached to the first cam plate 112 moves to pull the steel wire 210, so that the sliding member 213 moves toward the spring fixing portion 219 to compress the spring 212 due to the tension of the steel wire 210. The force of the compressed spring 212 removes the gravity caused by the own weight of the robot arm 100. Therefore, even when the robot arm 100 rotates about the second rotary shaft 106 by a constant angle, the robot arm does 100 not move downward due to the gravity, and maintains the posture thereof as in the non-gravitation state.

Next, the operation of the robot arm 100 rotating about the third rotary shaft 107 will be examined. When the link member 103 rotates about the third rotary shaft 107, the link member 103 rotates about the second rotary shaft 106. At this time, the second rotary member 102 and the bevel gears 110 and 111 do not rotate, and maintain the original posture thereof.

Therefore, only the link member 103 equipped with the spring 212 rotates, and tension is generated in the steel wire 210 to pull the sliding member 213, so that the spring 210 is compressed. The force of the compressed spring 212 removes the gravity caused by the own weight of the robot arm 100. Therefore, even when the robot arm 100 rotates about the third rotary shaft 107 by a constant angle, the robot arm 100 does not move downward due to the gravity, and maintains the posture thereof as in the non-gravitation state.

The elastic coefficient of the spring 212 may be appropriately designed in consideration of the own weight, the length, and the like of the robot arm 100.

Next, the operation of the second rotary link 104 located around the second cam plate 122 will be examined. The first cam plate 112 and the second cam plate 122 are connected to each other through the timing belt 131. Therefore, the second cam plate 122 rotates with respect to the link member 103 by the same angle as that of the first cam plate 112.

When the robot arm 100 rotates about the third rotary shaft 107 of the link member 103, the first cam plate 112 relatively rotates in the direction opposite to the rotation direction of the link member 103. Furthermore, the second cam plate 122 and the pair of second rotary bevel gears 121 connected to the second cam plate 122 also rotate in the direction opposite to the rotation direction of the link member 103. At this time, the first rotary link 160 connected to the shaft of the fixed bevel gear 120 also rotates in the direction opposite to the rotation direction of the link member 103. Therefore, the first rotary link 160 rotates in the direction opposite to the rotation direction of the third rotation 107 of the robot arm 100.

When the robot arm 100 rotates about the second rotary shaft 106 of the link member 103, the pair of second rotary bevel gears 121 connected to the pair of second cam plates 122 rotate in the opposite direction each other. The fixed bevel gear 120 rotates in the direction opposite to the rotation direction of the robot arm 100. Furthermore, the second rotary link 104 fixed to the fixed bevel gear 120 also rotates in the direction opposite to the rotation direction of the robot arm 100.

Therefore, the second rotary link 104 is operated in parallel to the first rotary member 101 with respect to the second rotation and the third rotation of the robot arm 100.

In the multi-degree-of-freedom robot arm, when only the weight compensation for the three-degree-of-freedom rotation is considered, all components 104, 122, 131, 160, and 161 relating to the differential bevel gears 120 and 121 may be excluded in the robot arm 100. That is, when multiple degrees of freedom equal to or more than three degrees of freedom need to be handled, the components relating to the differential bevel gears 120 and 121 are attached.

Figure 5:
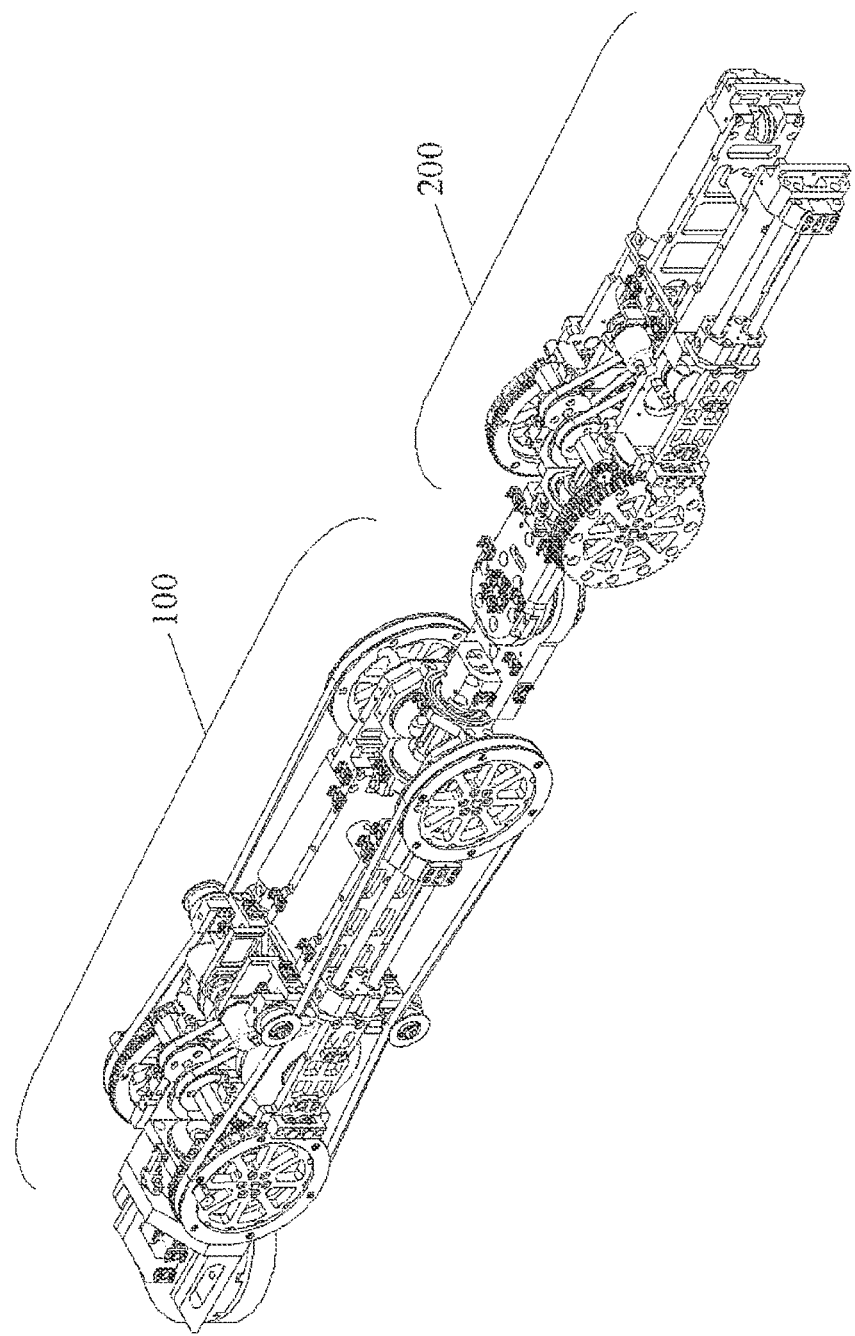
FIG. 5 illustrates a structure in which the robot arms shown in FIG. 1 are connected to each other in series.

FIG. 5 illustrates a configuration of a multi-degree-of-freedom robot arm with three degrees or more of freedom adopting the robot arm 100 of FIG. 1. A second robot arm 200 having the same structure as that of the robot arm 100 is connected to the second rotary link 104 of the robot arm 100. That is, the second robot arm 200 is rotatable in three degrees of freedom with respect to the second rotary link 104 of the robot arm 100. Furthermore, since the second rotary link 104 of the robot arm 100 is operated in parallel to the first rotary member 101 of the robot arm 100, the weight compensation may be also perfectly guaranteed in the second robot arm 200 as in the robot arm 100.

Figure 6:
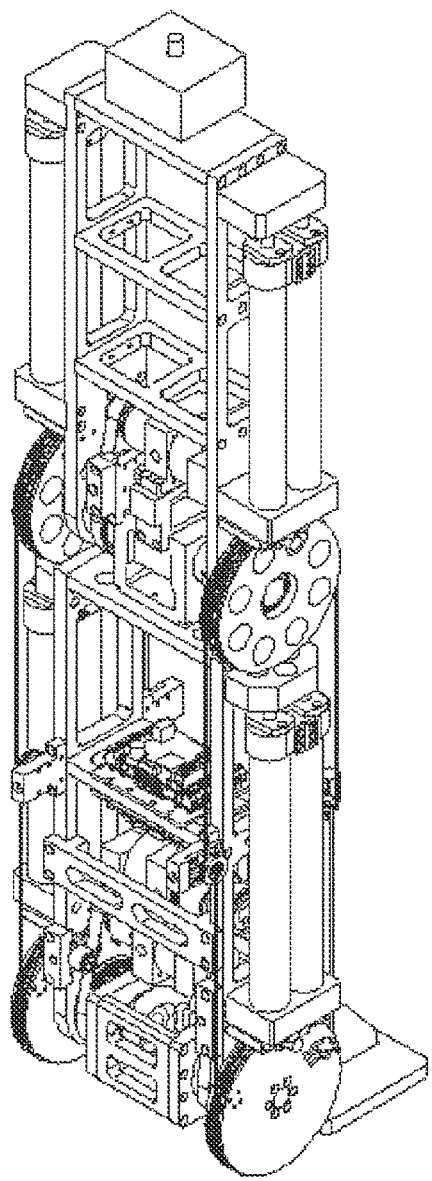
FIGS. 6 and 7 are diagrams illustrating a four-degree-of-freedom robot arm according to another embodiment of the disclosure.
Figure 7:
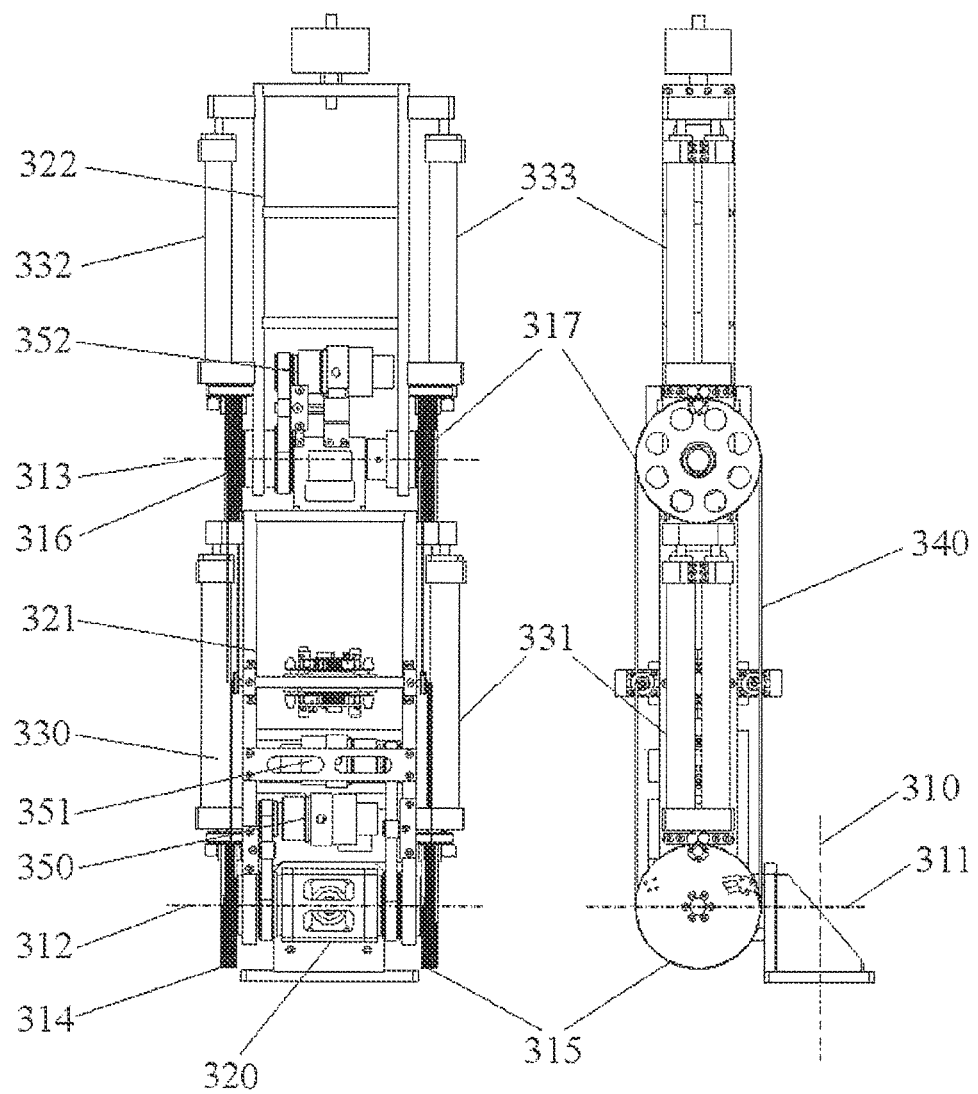

FIGS. 6 and 7 are diagrams illustrating a four-degree-of-freedom robot arm according to another embodiment of the disclosure.

Referring to FIGS. 6 and 7, as in the robot arm 100 of FIG. 1, a first link member 321 rotates about a first rotary shaft 310, a second rotary shaft 311, and a third rotary shaft 312, and further a second link member 322 rotates about a fourth rotary shaft 313.

The differential bevel gear of FIG. 1 is provided in the second rotary link 320, and a pair of first cam plates 314 and 315 is fixed to the bevel gear rotating about the second rotary shaft 311. One ends of one-degree-of-freedom weight compensators 330 and 331 are rotatably fixed to the first cam plates 314 and 315, and the other ends of the one-degree-of-freedom weight compensators 330 and 331 are fixed to the first link member 321.

For the weight compensation of the second link member 322, second cam plates 316 and 317 are adapted to be rotatable about the fourth rotary shaft 313. Furthermore, one ends of one-degree-of-freedom weight compensators 332 and 333 are rotatably fixed to the second cam plates 316 and 317, and the other ends of the one-degree-of-freedom weight compensators 332 and 333 are fixed to the second link member 322.

Wire grooves are respectively provided on the circumferential surfaces of the first cam plates 314 and 315 and the second cam plates 316 and 317, and both first cam plates 314 and 316 are respectively connected to both second cam plates 315 and 317 through wires 340. Therefore, when the first cam plate 314 rotates, the second cam plate 316 also rotates by the same angle.

Since the four-degree-of-freedom robot arm of FIG. 7 further has a structure for the fourth rotation compared to the three-degree-of-freedom structure of FIG. 1, the weight compensation may be perfectly performed in all postures. Furthermore, the cam plates 314, 315, 316, and 317 respectively includes the timing belt pulleys as in the embodiment of FIG. 1, and may be connected to each other through the timing belts. Furthermore, a structure may be adopted in which a rotary portion is provided on each of the side surfaces of the cam plates 314, 315, 316, and 317 and the rotary portions are connected to each other through links.

For the rotation of the first link member 321, motors 350 and 351 are provided in the first link member 321, and the first link member 321 is connected to the bevel gear rotating about the second rotary shaft 311. Therefore, the third rotation and the second rotation may be realized by the motors 350 and 351. Although the motor for the first rotation is not shown in FIG. 7, the motor may be disposed similarly to the motor of FIG. 1.

A motor 352 for the fourth rotation is provided in the second link member 322, and is connected to the fourth rotary shaft 313 through the belt. The arrangement of the motors of FIG. 7 is merely an example, and various structures may be adopted.

The weight compensation mechanism according to the disclosure can remarkably reduce power of a power source used for driving a robot arm and various link members. Further, since such power reduction leads to a decrease in weight of the entire robot arm and an increase in power efficiency, there is an advantage in that much energy is saved.

Furthermore, since the weight compensation mechanism according to the disclosure needs a relatively small driving force, manufacturing cost can be reduced, and hence there is an advantage in that a product having a competitive price can be developed if the weight compensation mechanism is practically used some day.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A weight compensation mechanism installed at a robot arm of which one end is rotatable with three degrees of freedom and the other end is rotatable with two degrees of freedom,
wherein a first rotation of one end of the robot arm is a yaw rotation aligned with a direction of gravitational pull of earth, and second and third rotations of one end of the robot arm are respectively a roll rotation and a pitch rotation,
wherein the second and third rotations of one end of the robot arm are restrained by a plurality of differential bevel gears,
wherein a pair of first cam plates is fixed to shafts of a pair of first rotary bevel gears in the plurality of differential bevel gears, and a one-degree-of-freedom weight compensator is provided to be connected to the first cam plates, and
wherein a second rotary link as an output link of the two-degree-of-freedom rotation of the other end of the robot arm is restrained by the second and third rotations of one end of the robot arm to move in parallel to one end of the robot arm.

2. The weight compensation mechanism according to claim 1, wherein one fixed bevel gear of the plurality of differential bevel gears is fixed onto a second rotary shaft, and the other rotary bevel gears are rotatably attached onto a third rotary shaft.

3. The weight compensation mechanism according to claim 1, wherein one end of the one-degree-of-freedom weight compensator is fixed to a second cam plate connected to a second rotary bevel gear or the second rotary bevel gear rotating about a fourth rotary shaft or the first cam plate disposed outside the first rotary bevel gear, and the other end of the one-degree-of-freedom weight compensator is fixed to a first rotary link.

4. The weight compensation mechanism according to claim 1, wherein the two-degree-of-freedom rotation of the other end of the robot arm is restrained by a differential bevel gear.

5. The weight compensation mechanism according to claim 4, wherein one fixed bevel gear the plurality of differential bevel gears is fixed to the second rotary link disposed on a fifth rotary shaft, and the other rotary bevel gears are rotatably fixed to the first rotary link.

6. The weight compensation mechanism according to claim 1, further comprising a synchronization device synchronizing the rotation of a second rotary bevel gear rotating about the fourth rotary shaft and the rotation of the first rotary bevel gear rotating about the third rotary shaft.

7. The weight compensation mechanism according to claim 6, wherein the synchronization device has a structure in which timing belt pulleys are respectively provided on the second rotary bevel gear rotating about the fourth rotary shaft and the first rotary bevel gear rotating about the third rotary shaft and the timing belt pulleys are connected to each other through a timing belt.

8. The weight compensation mechanism according to claim 6, wherein the synchronization device has a structure in which wire pulleys are respectively provided on the second rotary bevel gear rotating about the fourth rotary shaft and the first rotary bevel gear rotating about the third rotary shaft and the wire pulleys are connected to each other through a wire.

9. The weight compensation mechanism according to claim 6, wherein the synchronization device has a structure in which rotary portions are respectively provided on the circumference of the second rotary bevel gear rotating about the fourth rotary shaft and the circumference of the first rotary bevel gear rotating about the third rotary shaft and the rotary portions are connected to each other through a link.

10. The weight compensation mechanism according to claim 1, wherein the one-degree-of-freedom weight compensator includes:
a spring of which one end is fixed to a spring fixing portion fixed to the link member and the other end is fixed to a sliding member moving along a guide bar attached to the spring fixing portion; and
a wire of which one end is fixed to a rotatable coupler provided in a side surface of a cam plate and the other end is connected to a wire fixing portion fixed to the link member through an idle pulley fixed to the link member and a pulley provided inside the sliding member, and
wherein when the sliding member moves toward the spring fixing portion, the spring is compressed.

11. The weight compensation mechanism according to claim 1, wherein three motors are independently connected to generate the first, second, and third rotations of one end of the robot arm.

12. A robot arm comprising the weight compensation mechanism according to claim 1.

13. A robot arm capable of performing a weight compensation with more than three degrees of freedom by connecting a plurality of weight compensation mechanisms according to claim 1 to each other.

* * * * *